Aug. 7, 1945. G. M. BOOTH 2,381,716
COLLAPSIBLE TUBE FOLDING APPARATUS
Filed May 20, 1942 7 Sheets-Sheet 1

FIG.1.

INVENTOR.
George M. Booth
BY John C. Kerr
ATTORNEY.

Aug. 7, 1945.  G. M. BOOTH  2,381,716
COLLAPSIBLE TUBE FOLDING APPARATUS
Filed May 20, 1942   7 Sheets-Sheet 3

INVENTOR.
George M. Booth
BY John C. Kerr
ATTORNEY.

Aug. 7, 1945. G. M. BOOTH 2,381,716
COLLAPSIBLE TUBE FOLDING APPARATUS
Filed May 20, 1942 7 Sheets-Sheet 5

INVENTOR.
George M. Booth
BY John C. Kerr
ATTORNEY.

Patented Aug. 7, 1945

2,381,716

UNITED STATES PATENT OFFICE 2,381,716

COLLAPSIBLE TUBE FOLDING APPARATUS

George M. Booth, Westfield, N. J., assignor to Wallace & Tiernan Products, Inc., Belleville, N. J., a corporation of New Jersey Application May 20, 1942, Serial No. 443,771

10 Claims. (Cl. 113—54)

This invention relates to apparatus for closing collapsible tubes, and more particularly to devices for folding, or for making progressive folds, at the end of a collapsible tube to close and seal the latter.

The invention is notably adapted for embodiment in automatic tube filling and sealing machinery, and an important object is to provide improved structure for gripping and folding the end of a collapsible tube, by machine operation and in a positive and more reliable manner than has heretofore been obtainable, particularly for certain types of collapsible tubes. Further objects are to provide arrangements for making successive folds at the end of a collapsible tube, more efficiently and uniformly, and in such way that the tube is effectively closed with a folded portion of ample mechanical strength and providing the desired seal, all without the necessity of applying or incorporating separate strips, bars or wires at the tube extremity. Other objects are to provide simplified and reliable tube folding mechanism; to provide novel forms of tube gripping, creasing and folding members, which enhance the accuracy and efficiency of folding operations on successive tubes; and to provide creasing and fold-supporting elements, conveniently of automatically actuated nature, which insure accuracy and completeness of the metal folding operation in the predetermined, desired manner.

Collapsible tubes are usually made of thin and rather soft metals, such as aluminum, copper, tin, lead, or the like, or alloys embodying one or another of such metals, but I have found that certain types of tube folding and sealing machinery at present available, especially apparatus designed to seal the tube simply by making successive folds at its end, are apt to be non-uniform in operation, and to fall short of performing the work satisfactorily.

The difficulties are particularly manifest in operating with certain types of tube material which are especially hard to fold without distortion, mis-alignment or buckling. For instance, in packaging certain types of chemical pastes or jellies having corrosive properties and subject to deterioration by exposure to the atmosphere, it has been found desirable to employ tubes made of lead and having a relatively thick wall (say, about eight one-thousandths of an inch, i. e., 0.008") and internally provided with a substantial coating of relatively hard wax or like protective material. In such instances the extremely soft and yet cumbersome character of the tube wall, taken with the added thickness of the wax lining (which may unavoidably include drops or thickened areas left at the end of the tube during the lining operation), make the tube notably hard to handle and in one prior type of folding machine where it was attempted to seal such tubes (having a diameter of approximately 1¼ inches), imperfect folding operation made it necessary to reject an unreasonably large number of the tubes delivered by the machine. The rejected tubes were badly folded, imperfectly sealed, and frequently showed that an early fold in the applied series was actually bent or flattened back by a succeeding or final folding operation. Accordingly, the present invention is designed to overcome these difficulties and to provide tube folding and closing apparatus which will function efficiently for practically any type of material of which collapsible tubes (for holding and dispensing liquid or semi-liquid materials) may be made.

To this and such further objects as will be hereinafter stated or apparent or which are incidental to the structure and use of the described apparatus, the invention may be conveniently explained by reference to a presently preferred embodiment thereof, which by way of illustrative example, is hereinafter described and is shown in the annexed drawings.

Referring to the drawings.

For convenience of illustration, the apparatus is shown as embodied in a tube filling and sealing machine of the turret type, for example wherein the collapsible tubes, with their open unsealed ends uppermost, are retained in suitable collets carried by a turret and are carried by suitable intermittent rotation of the turret through successive stations for tube filling and closing operations. It will be understood that other parts of such machines, including filling mechanism, driving structure, and indeed certain preliminary tube bending and final crimping devices, may be of known construction and hence for simplicity are omitted from the present illustration and description; and it will of course likewise be understood that the invention may be embodied in other kinds of machines than the illustrated turret type, or indeed in machines simply designed to perform one or more folding operations at one or a plurality of stations.

Figure 1:
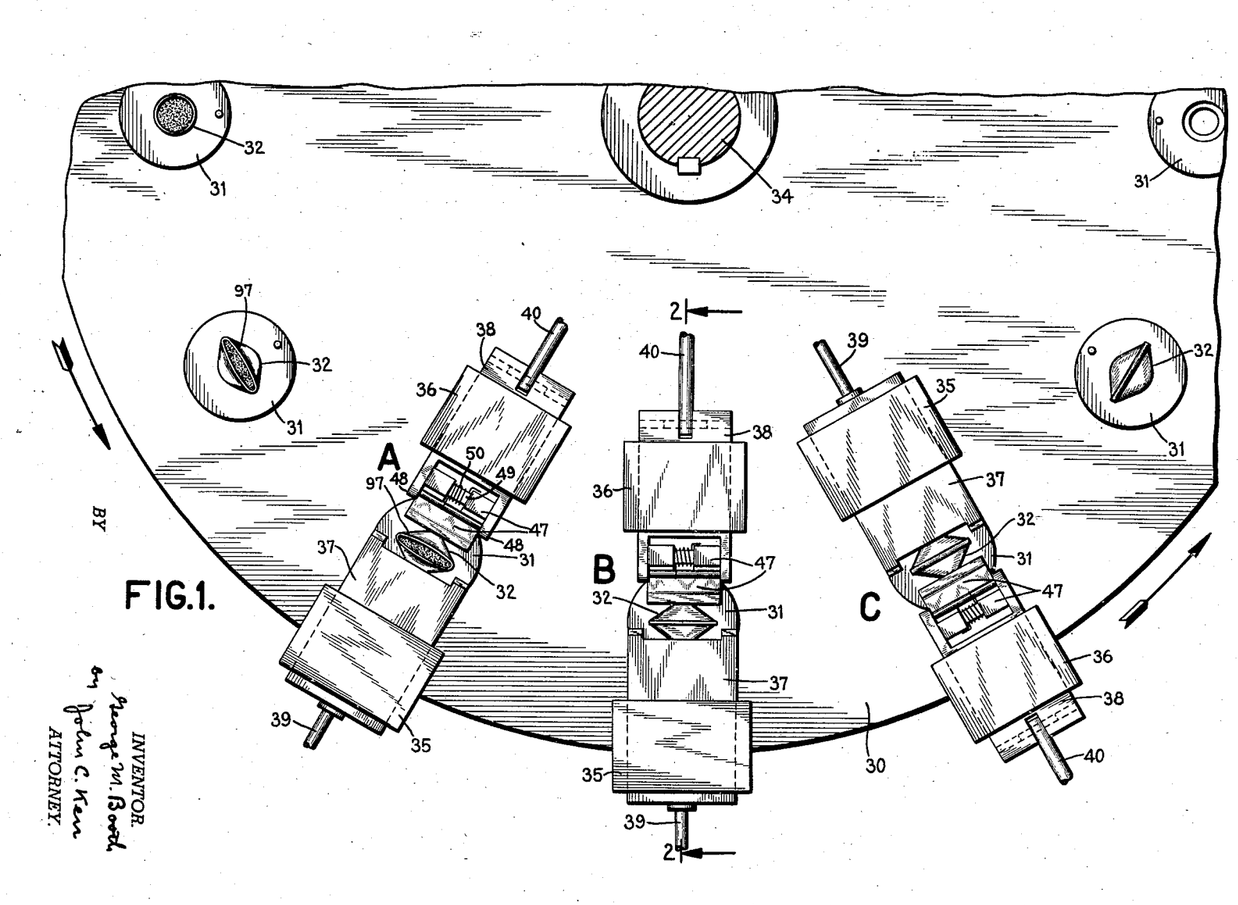
Fig. 1 is a fragmentary plan view of a tube handling and closing machine, showing tube folding structure of the invention embodied therein.
Figure 2:
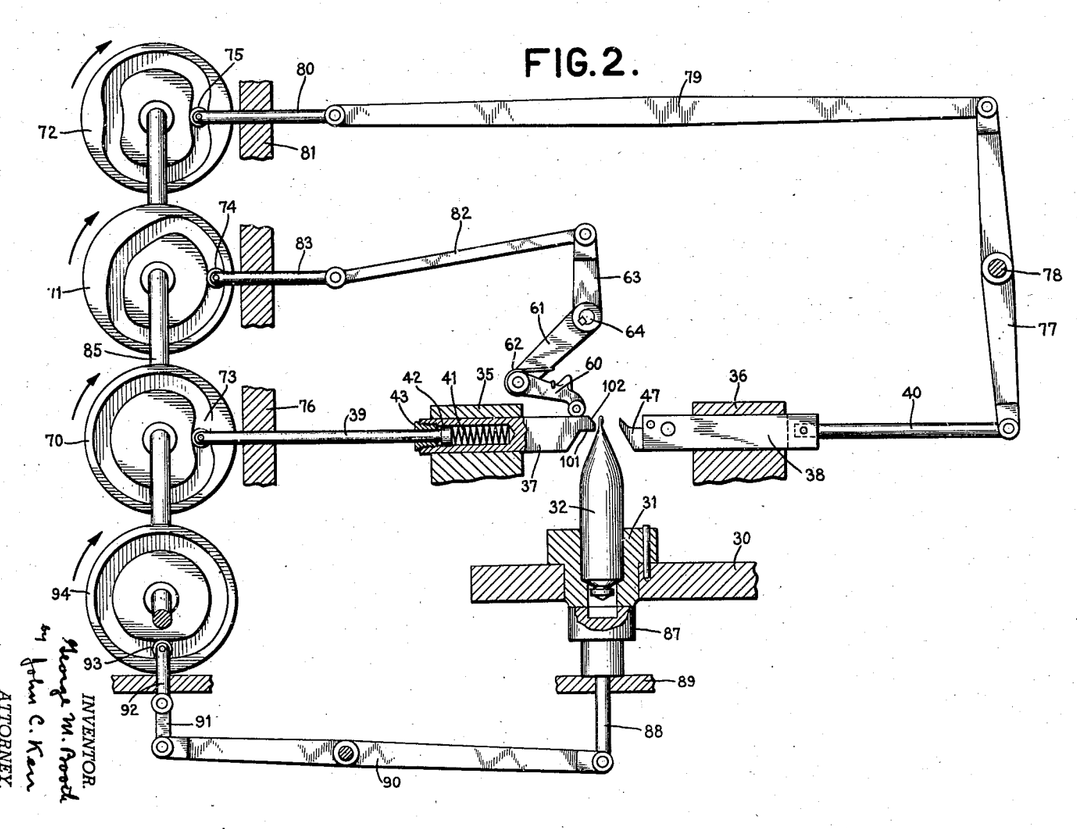
Fig. 2 is a side elevation, with certain parts in section as on the line 2—2 of Fig. 1, of the folding structure and showing diagrammatically, suitable actuating and controlling means.

Referring to Fig. 1 and to certain parts thereof illustrated in Fig. 2, it is therefore assumed, for instance, that the structure is embodied in a turret type machine, having a rotatable, horizontal turret 30 provided with a circumferentially arranged series of removable collets 31, each adapted to support a collapsible tube body 32, whereby a continuous series of collapsible tubes may be inserted in the collets and intermittently advanced past a filling station (not shown) where the desired liquid, paste or jelly is introduced, and through the folding stations presently to be described and thence onward for manual or automatic removal of the tubes from the collets. It will be noted that the tube bodies 32 are supported with their originally open ends uppermost and their screw caps or other dispensing means at the bottom. The turret 30 is intermittently advanced, as stated, by its vertical drive shaft 34.

For convenience of explanation and indeed as representing a satisfactorily rapid type of machine, the illustrated apparatus includes three principal folding stations respectively designated A, B and C; and although it will be understood that one or more of these may embody other types of folding devices, maximum advantage of the invention and full embodiment of its features in combination, are obtained with improved structure, of the type to be described, at each of the three stations. It will be understood that the collets 31 are successively advanced through the three stations A, B and C, and folding operations at each station are performed on the tube presented to it while the turret 30 remains at rest intermediate its successive movements in the direction of the arrows.

Figure 3:
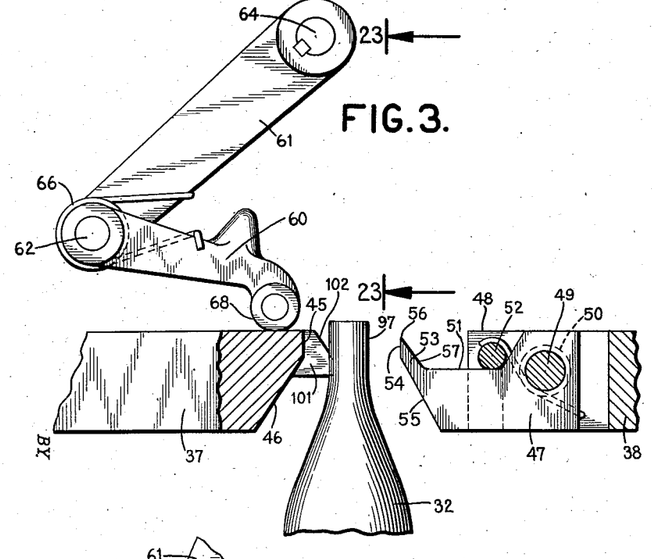
Figs. 3, 4, 5, 6, 7 and 8 are enlarged, chiefly elevational views of folding apparatus such as shown in Fig. 2, and respectively illustrating the position of the elements in successive stages of the sequence of operations to perform the first fold.

The structure of the folding device at each of the three stations being conveniently the same as that of the other stations, reference may now be had to Figs. 2, 3, 22 and 23 for illustration of these parts, and although Fig. 2 is conveniently shown as representing station B whereas Fig. 3 represents a set of positions actually assumed at station A, the structure of the parts and the essential sequence of operations are the same at all three stations, so the figures mentioned may be taken as representing any single one of the stations.

Figures 19, 20, 21, 22, 23:
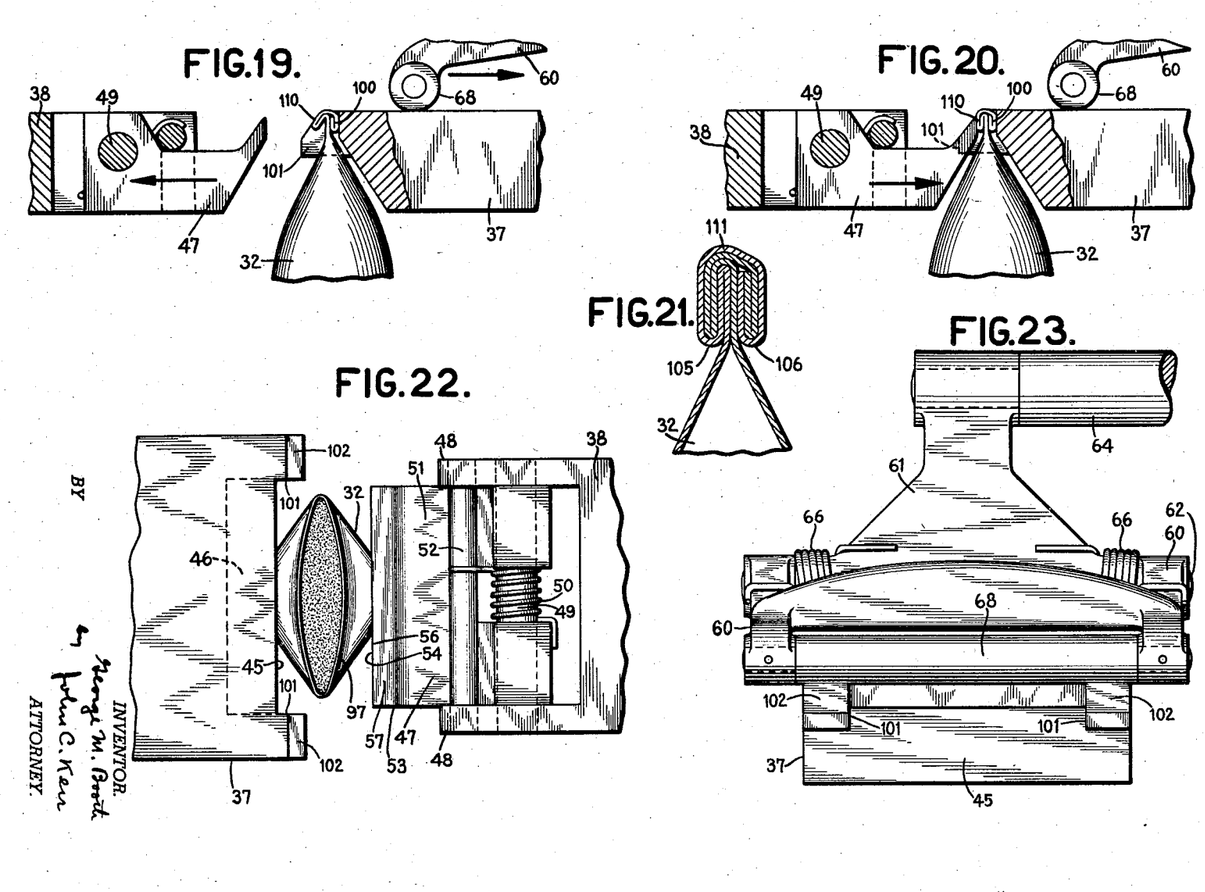
Fig. 21 is a greatly enlarged, sectional view of the finished, folded tube.
Fig. 22 is a plan view of the horizontally movable folding elements shown in Fig. 3, with the preliminarily closed but unfolded end of a tube therebetween.
Fig. 23 is an elevation viewed from line 22—22 of Fig. 3, with the tube removed.

Mounted to slide horizontally in suitable supporting members 35, 36, a pair of plates or tube-pressing members 37, 38 are generally disposed above the turret 30 and on opposite sides of the tube 32 in a path extending radially of the turret. Members 37, 38 are provided with operating rods respectively designated 39 and 40, and to avoid undue pressure on the tube, as well as possible injury of the tube-gripping surfaces, at least one of the members 37, 38—e. g. the member 37—is connected to its operating rod by a suitable resilient connection, such as the compressible spring 41 adapted to be engaged by a plunger 42 which is carried by the rod 39 and which is arranged to engage the inner end of a suitable bushing 43 for imparting outward movement to withdraw the member 37 from engagement with the tube 32. As shown in Figs. 3, 22 and 23, the tube-abutting end of the member 37 comprises a vertical surface 45 having a width at least equal to the flattened tube end and having a vertical dimension sufficient to compress the tube in the region where it is desired to be folded. For clearance of the tube body, the lower part of the same end of the member 37 may be suitably recessed or cut back as at 46.

The other member 38 carries a tube-engaging member 47 pivoted between supporting arms 48, 48 of the member 38, on a horizontal shaft 49 as shown. The member 47 is biased by the spring 50 into the position shown in Figs. 2, 3 and 22, i. e. so that a recessed portion 51 of the member 47 abuts against a stop pin or bar 52. The member 45 has a relatively heavy blade-like portion 53 which extends upwardly and at an angle toward the opposite tube-gripping member 37. The portion 53 conveniently has a vertical tube-gripping surface 54, generally similar to the opposite surface 45, but in the specific example shown, normally disposed with its upper edge slightly below the level of the upper surface of the member 37. The portion 53 is recessed or undercut at 55, as at 46 on the member 37, and from the upper edge 56 of the surface 55, the other side 57 of the blade portion 53 slopes rearwardly and downwardly, so that the portion defined by the surfaces 54 and 57 forms a creasing member whereby tube material engaged by the surface 54 may be folded over the creasing edge 56 and against the surface 57 in the manner hereinafter described. In the illustrated structure, the surfaces 54 and 57 form an angle of approximately 45° and it is ordinarily preferred that this angle of the creasing blade be of that or smaller value, although in some cases somewhat larger angles, say of the order of 60° or so may be used.

Disposed immediately above the members 37 and 38, a folding arm 60 is appropriately pivoted to a crank arm 61 on a horizontal shaft 62 (see Fig. 23). The crank arm 61 is part of a crank having an upper arm 63 (Fig. 2), the arms 61, 63 being mounted on a common shaft 64 which may be carried in a suitable bearing (not shown) at a fixed point of the machine. Resilient means such as the coil springs 66, 66 intermediate the arms 60 and 61, strongly urge the arm 60 in a downward direction (e. g. clockwise as seen in Figs. 2 and 3) with respect to the arm 61. At its lower and outer end the arm 60 carries a cylindrical or otherwise conveniently curved folding member 68 which extends horizontally and transversely of the members 37 and 38, and is kept in engagement with the upper surface of the member 37 by the springs 66.

Although other suitable actuating or controlling means may be readily employed, as will be understood by those skilled in the art, Fig. 2 shows diagrammatically and for purposes of illustration, a series of box cams 70, 71 and 72 with their respectively cooperating followers 73, 74 and 75, for operating the movable parts hereinabove described. Thus the follower 73 is rotatably mounted at the end of the connecting rod 39, whereby rotation of the cam 70 periodically reciprocates the rod 39 (sliding through a suitable guide plate 76) in accordance with the characteristics of the cam. Similarly the connecting rod 40 is pivoted at its outer end to one extremity of a rocker arm 77 which rocks about a fixed axis 78 and which at its other end is connected through a link 79 to the rod 80 which carries the follower 75, the rod 80 sliding through a suitable guide plate 81. Likewise the upper end of the arm 63 of the crank 61—63 is connected through a link 82 to the rod 83 upon which the follower 74 is mounted. It will be understood that the characteristics of the grooves in the cams 70, 71 and 72 are conveniently such, i. e. as shown, as to provide the described sequence of movements for the tube-gripping and folding members, and the cams are appropriately timed for operation together, for instance as mounted on a common shaft 85 which may be suitably actuated by the main driving mechanism (not shown) of the machine.

In some operations, for example at stations B and C in the particular apparatus illustrated in Fig. 1, means may be provided for elevating the tube holding collet 31 to raise the collapsible tube 32 into a desired position for folding operation. It may be explained that ordinarily, as the progressive folds are made at the end of the tube, the position of each succeeding fold is lower, i. e. closer to the collet 31. Although in apparatus of the sort shown in Fig. 1 this positional change may be effected simply by having the folding elements (e. g. members 37, 38 and associated parts) of the stations A, B and C at respectively and successively lower levels—thus obviating the need for any collet-displacing arrangement in this part of the machine—other aspects of machine design may make it desirable to keep the folding elements in the same horizontal plane. In such case, means for raising the collets are useful. Similar means would also be useful, in the event that successive folding operations are to be made at a single station, as may be readily accomplished with the illustrated structure.

Although other forms of collet-shifting mechanism may be employed, the illustrated arrangement comprises a collet-abutting plunger or head member 87 carried on a connecting rod 88 suitably guided by the plate 89. The rod 88 is connected, through the rocker arm 90 and the link 91 to the rod 92 carrying a follower 93 for the groove of a suitable box cam 94. In the apparatus shown the configuration of the groove of the cam 94 is intended to provide a desired elevation of the collet and tube 32 from the lowermost position in which it is presented at station A, to the position for a desired folding operation at station B. Thus the complete structure of Fig. 2 may be taken as actually representing, in partial diagrammatic form, the apparatus of station B, and the cam 94 is conveniently mounted on the same shaft 85 as the other cams, or is otherwise arranged for rotation in proper timing relation thereto. It will be understood that the arrangement for station C may be similar, with the configuration of the cam 94 providing the desired further or greater elevation at that point; and it will also be understood that where the folding structure is designed to perform a plurality of successive folding operations at a single station, generally similar means and a corresponding cam 94 may be employed for elevating the collapsible tube at the desired time or times; in such case, of course, the configuration of the cam groove will be appropriately designed for the desired lift, and the timing of the cam groove arranged, e. g. by suitable reduction gearing or the like from the shaft upon which the other cams are mounted, to provide for two or more rotations of the other cams during a single rotation of the cam 94, all as will now be readily understood.

Referring again to Fig. 1, it will be assumed that the collapsible tubes intermittently advanced by the turret toward station A have been appropriately filled, and preferably that by a device of known construction (not shown) a preliminary crimp or squeeze 97 has been imparted to the open end of the collapsible tube; this to facilitate the actual sealing operations, as will be understood by those familiar with the art. The turret is advanced so that a collet-mounted tube, conveniently crimped as just described, is disposed between the members 37 and 38 at station A, and the parts are in position to carry out the first folding operation, actuated by such means as are shown in Fig. 2 and as there embody the cams 70, 71 and 72.

Figure 4:
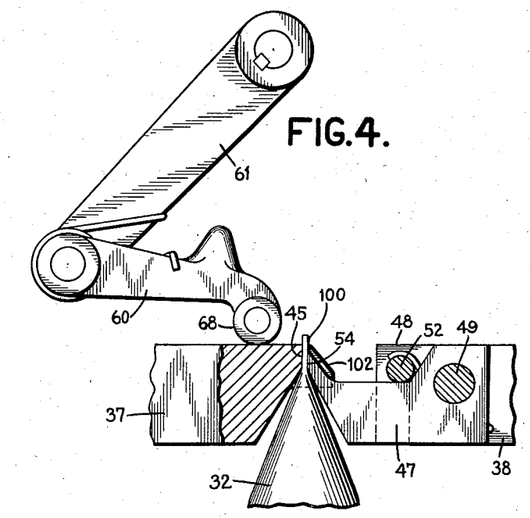
Figure 5:
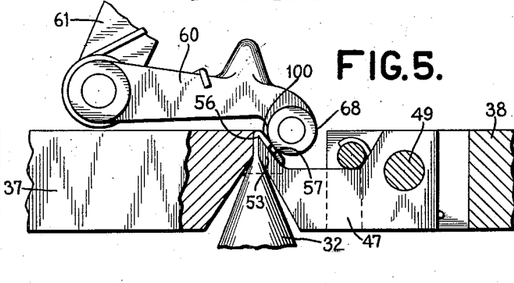

Referring now to Figs. 3, 4, 5, 6, 7 and 8, it will be observed that the initial positions of the several parts, including the tube 32, are as shown in Fig. 3. The members 37 and 38 are then moved toward each other so that the end of the tube is squeezed flat between the surfaces 45 and 54 as shown in Fig. 4. Thereupon the crank arm 61 is rotated in a counterclockwise direction, carrying the folding member 68 across the upper surface of the member 37 and toward the member 38. As the member 68 so travels, it engages the upwardly projecting and flattened portion 100 of the tube (see Fig. 4), and folds it down over the edge 56 and against the surface 57 of the creasing blade 53. The parts are now as shown in Fig. 5.

It may here be noted that the member 37 is conveniently provided with portions 101, 101 (see also Fig. 22) disposed at each side of the surface 45 and extending toward the member 38. The portions 101 are each provided with a sloping surface 102, advantageously having the same angle of slope as the surface 57, and so disposed that when the members 37 and 38 have engaged the end of a tube and when the member 68 is passed over the end of the tube 100, folding it down as just explained, support will be provided for the member 68, either then or at least at a subsequent time as is now about to be explained.

Figure 6:
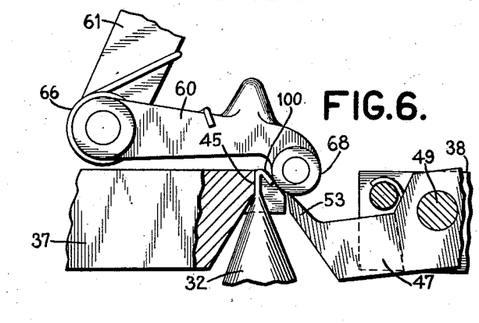

Following the folding step partially completed as in Fig. 5, the member 38 is then withdrawn, and as it moves away from the tube 32 the member 47 and its creasing blade portion 53 are rocked downwardly, i. e. counterclockwise as seen in Figs. 3 to 6, about the pivot 49 by reason of the camming action between the sloping surface 57 and the folding member 68 (acting in part through the downwardly folded tube end 100). Thus as the member 38 moves back, the blade portion 53 is moved down and under the folding member 68, as shown in Fig. 6. Conveniently, the spring pressure of the springs 66 urging the member 68 downwardly, is greater than the pressure of spring 50 biasing the member 47 in an upward direction, so as to facilitate the described operation without displacement of the folding member 68. It will be noted that the sloping and projecting surfaces 102, as hereinabove described, now support the member 68 and prevent the spring 66 from pulling it back into a relatively low position toward the surface 45, i. e. a position such as might fold the tube portion 100 flat against the adjacent tube portion but would lock the element 68, in effect, against the gripping surface 45 (or would cause damage to the tube metal or its fold by removal of element 68). Thus the portion 100 remains folded over at substantially the angle shown in Fig. 6 and Fig. 7.

Figure 7:
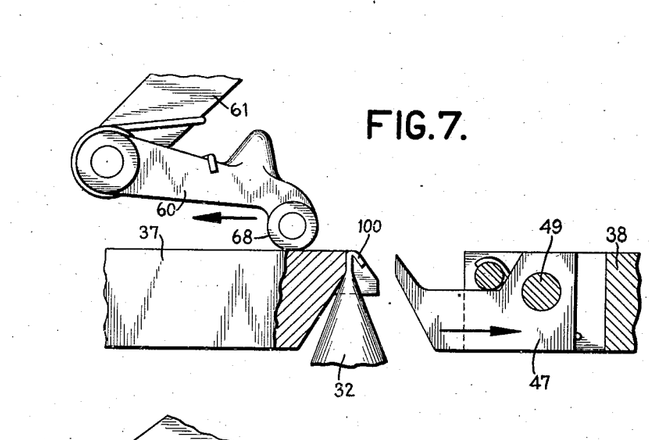
Figure 8:
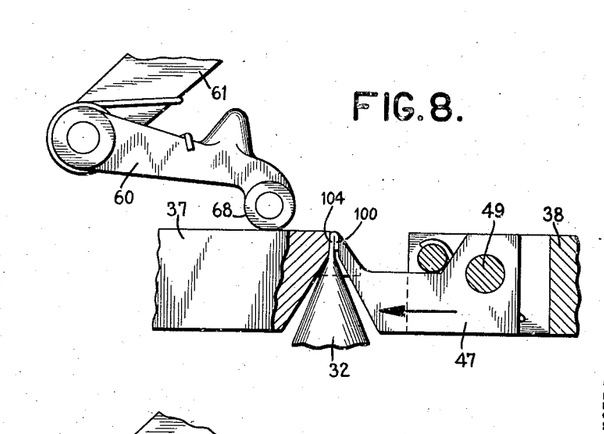
Figure 9:
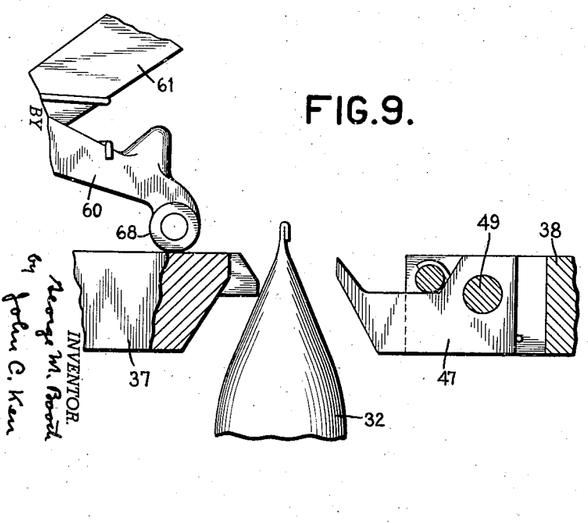
Figs. 9, 10, 11, 12, 13 and 14 are views of like apparatus, in similar fashion, illustrating successive stages of producing a second fold at the end of the tube.

Thereupon, the crank 61—63 is rocked in a clockwise direction as shown in these figures, retracting the member 68 up along the surfaces 102 and the upper surface of the member 37, so that the parts now assume the position shown in Fig. 7. Bearing in mind that when the blade portion 53 has been released from beneath the member 68, the pivoted portion 47 has been returned by its spring 50 to its original or normal position (see Fig. 7), the member 37 is now again moved forward toward and against the end of the tube. The surface 54 is thus brought against the tube portion 100, pressing the latter flat against the adjacent tube portion 104 and in abutment with the opposite gripping surface 45. This completion of the folding operation is illustrated in Fig. 8. The first fold, at station A, is now finished and the members 37 and 38 now separate to permit advancement of the tube to station B.

At station B, the position of the tube 32 relative to the folding device (of identical structure) is such that the tube is elevated with respect to the device, so as to facilitate the next desired fold. Although as explained above, the folding devices themselves may be disposed in different planes, an alternative means comprises structure such as shown in the lower part of Fig. 2, whereby the cam 94 and follower 93 appropriately act to raise the collet 31 in advance of the tube folding operations, and to maintain the collet in the elevated position throughout such operations.

Figure 10:
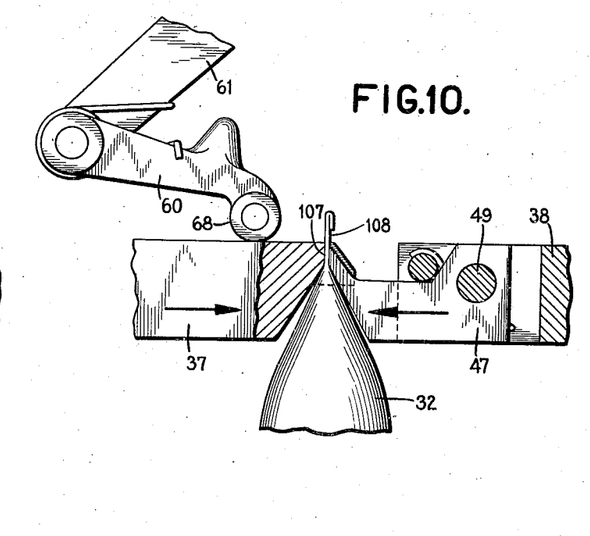
Figures 11, 13:
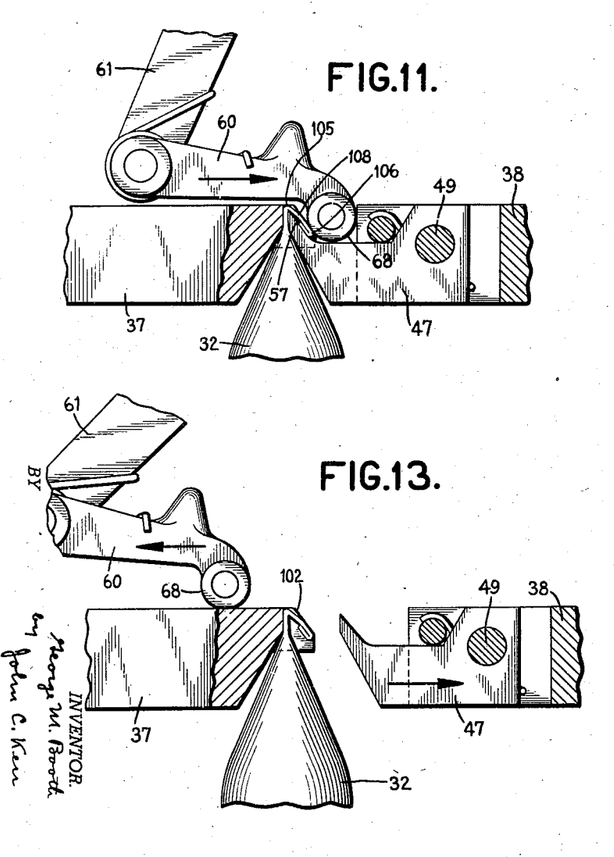
Figures 12, 14:
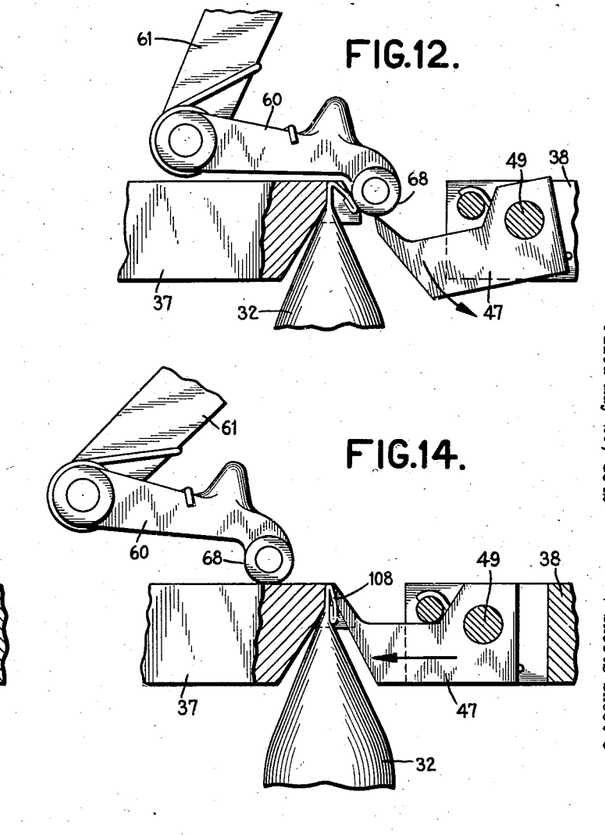
Figure 15:
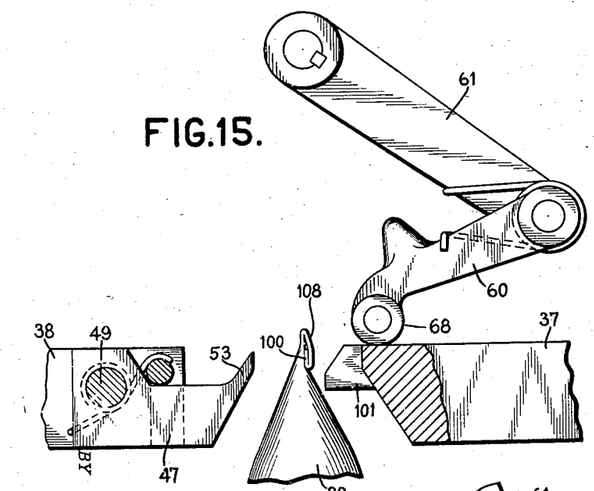
Figs. 15, 16, 17, 18, 19 and 20 are further similar views of like apparatus, arranged in reverse position, and showing the sequence of operations to produce a third fold at the end of the tube.
Figures 16, 18:
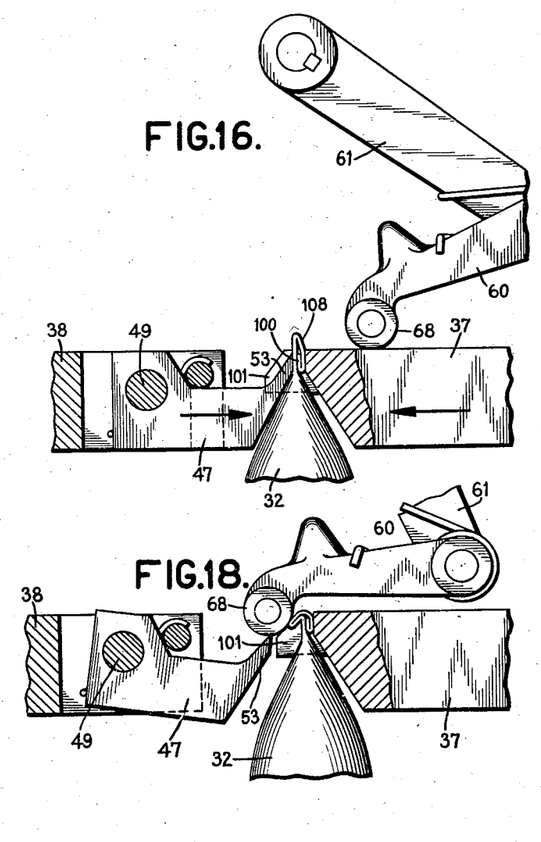
Figure 17:
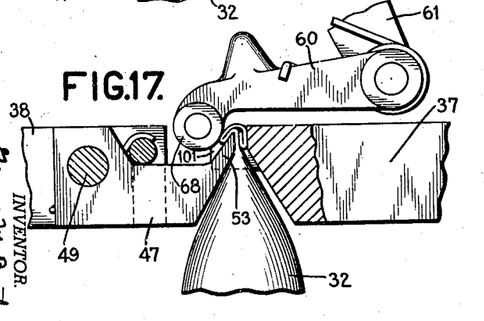

Without further detailed description, reference to Figs. 9, 10, 11, 12, 13 and 14, corresponding respectively to Figs. 3 to 8 inclusive, will reveal that the same type of folding operation, including the same cycle of movements of the parts, is carried out at station B. For convenient completion of the desirable type of triple fold which the illustrated machine is adapted to make in the end of the tube, the fold accomplished at station B is in the same direction as the previous fold of the portion 100, but is so made that its crease is at a point 105 along a line slightly further removed from the folded-over edge of the portion 100 than the last mentioned edge is from the previous crease 106 (see Figs. 11 et seq.). Thus with the tube and parts originally disposed as in Fig. 9, the surfaces 45 and 54 first grip the tube at a lower portion 107, as seen in Fig. 10. Thereupon the member 68 folds the relatively tall upstanding portion 108 down over the surface 57, as seen in Fig. 11, and the member 47 is then carried back and rocked under the member 68, as shown in Fig. 12. The member 68 is thereupon moved back, over the surfaces 102 and the upper surface of the member 37, as shown in Fig. 13, and the restored member 47 is finally brought into renewed abutment with the tube, to flatten down the folded portion 108, as in Fig. 14. Thereupon the members 37 and 38 again separate, as at station A, and the turret moves the tube on to station C.

For the particular type of triple fold set forth by way of example, the third fold is conveniently accomplished in the opposite direction from the first two, thereby affording a notably efficient seal at the end of the tube. Although the necessary reversal of tube position might be otherwise accomplished, for example by manually rotating the tube 32 intermediate stations B or C—or in arrangements utilizing only a single set of folding members, by turning the tube intermediate the corresponding folding operations—the illustrated apparatus simply embodies the same folding structure at station C but in a reverse position with respect to the turret, as will be readily apparent from Fig. 1.

The actual structure of folding parts being otherwise conveniently identical or substantially identical with those of stations A and B, it will be seen that the operations at station C, illustrated in Figs. 15 to 20 inclusive, function exactly the same as heretofore described in connection with the respectively corresponding Figures 3 to 8 inclusive or 9 to 14 inclusive. Without detail reference to the successive movements of the parts, it will thus be noted that in Figs. 15 to 20, the position of the tube 32 is again appropriately elevated (as by means similar to that shown in Fig. 2), and after the flattening operation (Fig. 16) of the tube portion now abutting the first fold 100, the upper part of the flattened loop produced by folding over the portion 108 at station B is now folded back over the other part of the tube end (Figs. 17 et seq.) so that the final gripping operation of Fig. 20 flattens this double folded portion 110 against the adjacent tube walls of the previous fold 100.

The operations at station C are completed by appropriate separation of the parts 37, 38 and the turret then advances the tube to the usual further station or stations in the complete machine (not shown), such as a crimping or beading station if desired, and an automatic or manual ejecting station.

By way of fuller illustration of the completely interlocked set of folds produced uniformly and reliably with apparatus of the described character, Fig. 21 shows an enlarged vertical section through the end of the tube. As shown in this figure, it will be remembered that the thicknesses of folded material illustrated in preceding views are in reality double thicknesses of the tube metal, comprising opposite sides of the collapsible container. Yet despite these double thicknesses, and other impeding characteristics which may be present as previously explained, the apparatus reliably and accurately folds every tube end in the complex arrangement illustrated, forming a tight, strong and satisfactorily leak-proof closure at the end of the tube. As will be observed in Fig. 21, the crease 106 is that produced at station A; the crease 105 is that produced at station B; and the upper fold or crease 111 is the fold which, though involving four thicknesses of metal, is satisfactorily and firmly produced at station C, without dislocation of previous folds and without distortion or injury of any of the layers of metal.

It will now be seen that the described mechanism affords positive and accurate folding operations, which may be carried out with tubes of soft or otherwise cumbersome material and yet which have achieved remarkably uniform results in automatically closing and sealing the ends of collapsible tubes. Not only is each fold made over an appropriate creasing edge, but positive support is afforded for the folded part as it is brought down into an acute angle with the adjacent or "standing" part of the tube. In this way, difficulties heretofore encountered in attempting to flatten a right-angle fold—often involving opening or derangement of the fold or even injury to the metal—are positively avoided. At the same time, the fold is effectively completed, from the described acute angle relation, by pressure between parallel gripping surfaces, which thus flatten down the fold. At the same time, too, the mechanism is remarkably simple and as in the embodiment shown by way of example, various elements are arranged and adapted to perform a plurality of functions. Thus the pivoted creasing and pressing member 47, for instance, cooperates for pressing action in advance of folding, provides the desired creasing edge and fold supporting surface to permit a reliable fold into the acute angle position, and finally is withdrawn and again advanced to cooperate in the final pressing action. As will also be apparent, each fold is separately completed, without disturbing previous folds, and without attempt to press or flatten a plurality of incompleted folds at the same time; yet the apparatus is capable of operation with remarkable rapidity and with an economy of cycles of movement. Finally, although the apparatus may be advantageously arranged for separate embodiment to perform successive folds in a single machine, the structure is the same or substantially the same for each folding operation. In this way, an economy of manufacture is achieved, and replacement or adjustment is facilitated, since only a minimum number of different kinds of parts are required for the apparatus. Moreover, by virtue of its flexibility, a single unit of the machine may be adapted to perform a plurality of successive folding operations, or even to perform all such operations as may be desired.

It will be understood that the invention is not limited to the specific embodiments herein shown and described but may be carried out in other ways without departure from its spirit.

I claim:

1. In apparatus for closing a collapsible tube, the combination, with means for holding a collapsible tube, of a pair of members for abutting directly opposite sides of a flattened tube portion, one of said members having an associated supporting member for moving the first-mentioned member relative to the other member and to the flattened tube portion in a direction substantially perpendicular to the tube portion, said first-mentioned member having a creasing edge to abut the flattened tube portion, means for folding an adjacent tube portion over said creasing edge and into an acute angle with the first mentioned portion when the members are in position of directly opposing abutment with the tube, said first-mentioned member being pivoted to the supporting member at a point offset from a line perpendicular to the first-mentioned tube portion and passing through the locality of said direct abutment of the members, for release of the creasing edge from beneath the fold when the members are separated, and stop means intermediate the supporting member and the first-mentioned member, and positioned to hold the latter against movement of its creasing edge, about said pivot, toward the other side of said line from the pivot point, whereby pressure of the aforesaid abutment of said first-mentioned member with the tube urges the first-mentioned member against said stop means rather than around the pivot and out of fold-supporting abutment with the tube, said first-mentioned member including means releasably biasing said first-mentioned member against the stop means.

2. In apparatus for closing a collapsible tube, in combination, a pair of members for gripping a tube portion therebetween, one of said members having a creasing edge to abut the tube portion and a rearwardly facing, sloping surface extending from said creasing edge, a folding device movable relative to the other of the members, for engaging an adjacent tube portion and folding same over the creasing edge toward said surface and into an acute angle fold, a reciprocable element for moving said creasing-edged member toward and away from the other member, said creasing-edged member being pivoted to the reciprocable element to swing transversely of the path of movement of said element into and away from fold-supporting position, and having means yieldably biasing said creasing-edged member about its pivot into fold-supporting position, and means for reciprocating said reciprocable element to move the creasing-edged member to and away from a position to hold the first-mentioned tube portion against the other member, and means timed with said reciprocating means, for actuating the folding device while the creasing-edged member is holding the first-mentioned tube portion against the other member, said sloping surface of the creasing-edged member being shaped for camming action against the folding device to swing the creasing-edged member out of fold-supporting position in response to withdrawal of said creasing-edged member by the reciprocating means.

3. In apparatus for closing a collapsible tube, in combination, means for supporting a collapsible tube, means for abutting a flattened end portion of the tube, and means brought into play while said second mentioned means abuts said portion, for folding over a part of said end portion into an acute angle with the remainder thereof and for thereafter pressing the folded part flatwise against said remainder and said abutting means, said folding means including a member having a tube-abutting surface for flattening said end portion against the first-mentioned tube-abutting means and having a creasing edge along said surface for supporting the inner side of said folded part at the line of fold, a folding device movable relative to said tube-abutting means and said member, for engaging the said part of the tube and folding same over the creasing edge into said acute angle, and displaceable means for moving said member into and away from tube-abutting position, said folding device having actuating means timed with said displaceable means, for operating said folding device when the tube is abutted and stationarily held on opposite sides by the member and the tube abutting means, and said member being pivotally mounted to said displaceable means and including means camming said member about its pivot to release the creasing edge from beneath the folded part, upon withdrawal of the member from the tube by the displaceable means.

4. Apparatus for closing a collapsible tube, comprising in combination, means for holding the tube, a pair of parallel-faced members movable toward each other to engage directly opposite sides of a tube held by the first-mentioned means, one of said members having a creasing edge adjacent the tube end and being shaped to provide a creasing blade to abut the tube, member-moving means including operating means connected to the creasing-edged member and movable toward and away from the other of said members, for bringing said members together to engage the tube therebetween in flattened condition with the flattened end of the tube extending beyond said members, and means including a tube-end folding element, for bending the exposed tube end over said creasing edge and into an acute angle with the tube portion which is engaged by said members, said folding element having associated means timed with the member-moving means, for actuating the element while the members are engaged with directly opposite sides of the tube, said creasing-edged member being pivotally mounted to its said operating means, to swing transversely of the path of movement of the latter, said creasing-edged member including means normally biasing same into crease-supporting position, and said creasing-edged member being adapted to swing out and past the folded tube end upon movement of said operating means away from the other member.

5. In apparatus for closing a collapsible tube, in combination, a pair of members relatively movable toward and away from each other to engage a tube therebetween, said members having parallel directly opposed surfaces for holding a portion of the tube in flattened condition, means for moving one of said members, a reciprocable element for moving the second of said members, the second of said members having a creasing edge along its tube-holding surface and a rearwardly facing surface sloping from said edge at an acute angle to the tube-holding surface thereof, and said second member being also pivoted to the reciprocable element to move transversely of the aforesaid path of relative movement and in a direction to withdraw said creasing edge from juxtaposition with a flattened tube, a folding member movable against a part of the tube adjacent that held by the first and second members, for folding said part over the creasing edge and against the aforesaid sloping surface to produce an acute angle fold, said second member including means yieldably biasing said second member about its pivot into position of parallelism of its tube-engaging surface with that of the first member, whereby upon operation of said reciprocable element and upon moving said second member about its pivot to withdraw its creasing edge from beneath the tube fold, said first and second members may be brought together to flatten the tube fold between their parallel surfaces.

6. In apparatus for closing a collapsible tube, the combination, with means for supporting a collapsible tube, of means having a flat surface for flatwise abutting a portion of a tube supported in the first-mentioned means, a blade-like member having a flat surface adapted to face the first-mentioned surface and a creasing edge along one side of said second-mentioned surface, means mounting said member for movement transversely of the first mentioned flat surface, to withdraw the creasing edge from a tube fold superimposed thereon, and including yieldable means adapted to maintain said member with its flat surface directly facing the first mentioned flat surface, means for moving said second mentioned means and said member toward and away from each other, for engaging the aforesaid tube portion in flattened condition between their respective flat surfaces and for releasing the tube, and means timed with said moving means and adapted to engage a tube portion projecting beyond said creasing edge, for folding said last-mentioned portion over the edge and back into an acute angle with the first-mentioned flattened tube portion, when the latter is held between the second-mentioned means and said member.

7. In apparatus for closing a collapsible tube, the combination, with means for supporting a collapsible tube, of a pair of members having means for moving same toward and away from each other to engage and release a flattened portion of the tube therebetween, said members having opposed, normally parallel flat vertical faces to abut the tube portion, and one of said members having a flat upper face and the second of said members having a rearwardly facing fold-supporting surface intersecting its vertical face at an acute angle to provide a creasing edge disposed slightly below the upper edge of the vertical face of the first member, a folding element having means resiliently urging same against the upper surface of the first member, means for moving said element across and beyond said upper surface and against a free portion of the tube extending above the pair of members, whereby said last mentioned means and said resilient means cause the element to fold said free portion over the creasing surface and against the tube-supporting surface, and means including a reciprocable member operated by the second mentioned means and pivotally connected to the second member, for mounting said second member to swing downwardly of its path of movement by the second mentioned means, whereby retraction of said second member by said second-mentioned means, after folding operation of the said element, causes said second member to swing down and under the folded over tube portion.

8. The apparatus of claim 7, wherein the first member includes structure projecting therefrom adjacent its vertical face, to engage the folding element and prevent the same from moving substantially beyond the normal position of said tube-supporting surface and thereby to facilitate retraction of said element upon withdrawal of the second member, and wherein the mounting means for the second member includes means resiliently biasing said second member into position with its vertical face parallel to the face of the first member, whereby upon retraction of said second member and said folding element, said second member may be moved back to flatten the tube fold against the first member.

9. In apparatus for closing a collapsible tube, in combination, a pair of members for gripping a tube portion therebetween, one of said members having a horizontal upper surface disposed transversely of the tube and extending rearwardly therefrom and the other of said members comprising a creasing blade, a folding member movable across said surface to the locality of tube engagement by the pair of members, and means movable in a direction along said surface for reciprocating said folding member into and away from said locality of tube engagement, said folding member having means urging it against the said surface, for causing said folding member to move downwardly over the creasing blade from the surface to fold an exposed tube portion thereover, said creasing blade having means for removing the same from beneath the fold produced by the folding member, and said first-mentioned member having a vertical tube-gripping face and arresting means adjacent said face and sloping outwardly therefrom for engaging said folding member and preventing the latter from pressing itself and the folded tube against said face upon removal of the creasing blade, to permit retraction of said folding member upwardly and across the aforesaid upper surface by movement of the reciprocating means.

10. In apparatus for closing a collapsible tube, in combination, a pair of members for abutting and gripping opposite sides of a flattened tube portion with a vise-like grip, the first of said members having a vertical tube-abutting face and the second of said members having a similar tube-abutting face and also a creasing edge located slightly below the top edge of the first member with a rearwardly and downwardly sloping face intersecting said creasing edge, a folding member adapted to move across the upper surfaces of the first two members while said second member is in its operative abutting position so as to fold over a projecting tube portion into an acute angle with itself and against said rearwardly and downwardly sloping face of the second member without movement of the latter, means movable in substantially rectilinear paths for moving the said first and second members, means pivotally mounting the second member to its moving means, means resiliently biasing said second member upwardly to its operative abutting position, said second member and its moving means being so constructed and arranged that its said moving means is the sole operative means effective to withdraw said second member from the position under the folding member after the crease is made and return it in position to abut the tube with the first named member, after the folding member has been withdrawn, to complete the fold.

GEORGE M. BOOTH.